United States Patent [19]

Hamala et al.

[11] Patent Number: 5,345,586
[45] Date of Patent: Sep. 6, 1994

[54] METHOD AND SYSTEM FOR MANIPULATION OF DISTRIBUTED HETEROGENEOUS DATA IN A DATA PROCESSING SYSTEM

[75] Inventors: Annette M. Hamala; William A. Maron, both of League City, Tex.; Rhoda A. Reyburn, Allison Park, Pa.

[73] Assignee: International Business Machines Corporation, Armonk, N.Y.

[21] Appl. No.: 934,975

[22] Filed: Aug. 25, 1992

[51] Int. Cl.⁵ .............................................. G06F 15/40
[52] U.S. Cl. .............................. 395/650; 364/DIG. 1; 364/280.6; 364/282.4; 395/600
[58] Field of Search ...................... 395/650, 600, 200; 364/DIG. 1 MS File

[56] References Cited

U.S. PATENT DOCUMENTS 4,714,995 12/1987 Materna et al. .............. 364/DIG. 1
5,119,465 6/1992 Jack et al. ..................... 364/DIG. 1
5,280,610 1/1994 Travis, Jr. et al. .................. 395/600

*Primary Examiner*—Thomas M. Heckler
*Attorney, Agent, or Firm*—Joseph F. Villella, Jr.; Andrew J. Dillon

[57] ABSTRACT

Manipulation of distributed heterogeneous data in a data processing system having multiple diverse data sources is permitted by providing a global data directory which maps the location of data, specific data entity attributes and data source parameters. An attribute table is provided within the global data directory which sets forth desired attributes in a logical data model for each data entity within the data processing system. A domain table related to the attribute table is utilized to specify domain information for each data entity attribute. Route and cross-reference tables are provided and utilized to specify data source or database parameters and a cross-reference between logical names within the logical data model and the diverse data sources. Desired heterogeneous data is then accessed utilizing the route and cross-reference tables and converted utilizing any known technique into an output having the desired attributes set forth within the attribute table. In this manner, a consistent interface between multiple distributed heterogeneous data sources and a system user is provided.

10 Claims, 16 Drawing Sheets

| GD_LDM_PHYS | | | | |
|---|---|---|---|---|
| Column | Type | Length | Nulls ? | Description |
| ENTITY | CHAR | 18 | N | The entity name (DB2 View name) |
| ATTR | CHAR | 18 | N | The attribute name (DB2 column name of the view) |
| TEST_FLG | CHAR | 1 | N | Entity test flag<br><br>P Promoted<br>N New<br>C Old Version<br>X Changed Version<br>D Deleted |
| TNAME | CHAR | 18 | N | The DB2 Table name |
| CNAME | CHAR | 18 | N | The DB2 column name |
| NOT_NULL | CHAR | 1 | N | Include the NOT NULL keyword for this attribute ?<br><br>Y Yes<br>N No |
| NULL_DEFAULT | CHAR | 1 | N | Include the WITH DEFAULT clause for this attribute ?<br><br>Y Yes<br>N No |
| ATTR_IND | CHAR | 1 | N | Indicates the origin of the attribute<br><br>M Manual<br>S System<br>D Derived<br>X Default Data Source |
| COL_SEQ | SMALLINT | | N | Sequence number of the column in the table |
| DOMAIN | CHAR | 18 | N | The domain that describes the characteristics of this attribute |
| DOMAIN_TEST_FLG | CHAR | 1 | N | Domain test flag<br><br>P Promoted<br>N New<br>C Old Version<br>X Changed Version<br>D Deleted |
| DESCRIPTION | VARCHAR | 254 | N | The attribute description |

*Fig. 3*

GD_DOMAIN

| Column | Type | Length | Nulls ? | Description |
|---|---|---|---|---|
| DOMAIN | CHAR | 18 | N | The domain name |
| DOMAIN_TEST_FLG | CHAR | 1 | N | Domain test flag<br><br>P Promoted<br>N New<br>C Old Version<br>X Changed Version<br>D Deleted |
| DATA_TYPE | CHAR | 18 | N | Attribute data type |
| LENGTH | SMALLINT |  | N | The length of the attribute. |
| SCALE | SMALLINT |  | N | The scale of the attribute. |
| UNITS | CHAR | 18 | N | The units of measurement for an attribute associated with this domain |
| DSO_IND | CHAR | 1 | N | Is this attribute an abstract data type and stored as a BLOB ?<br>( BLOB refers to a large binary data object )<br><br>Y Yes<br>N No |
| CODE_TABLE_FLG | CHAR | 1 | N | Flag indicating that the attributes within this domain have a code table.<br><br>Y Yes<br>N No |
| CODE_TABLE_NM | CHAR | 18 | N | Name of the code table associated with this domain |

*Fig. 4*

GD_LOG_REASON

| Column | Type | Length | Nulls ? | Description |
|---|---|---|---|---|
| USER_ID | CHAR | 7 | N | The User ID of the person making the change |
| UPDATE_DTM | TIMESTAMP |  | N | The update timestamp |
| REASON | VARCHAR | 254 | N | The reason that the LDM was changed |

*Fig. 10*

| GD_ENT_TRANS | | | | |
|---|---|---|---|---|
| Column | Type | Length | Nulls ? | Description |
| ENTITY | CHAR | 18 | N | The entity name (DB2 View name) |
| TEST_FLG | CHAR | 1 | N | Entity test flag<br><br>P Promoted<br>N New<br>C Old Version<br>X Changed Version<br>D Deleted |
| SPATIAL_FLG | CHAR | 1 | D | Flag indicating if this entity contains spatially-qualified attributes, and if so, the type of spatial representation (spatial refers to those entities which contain location information)<br><br>P Point<br>N Non-point<br>" Not spatial<br><br>Default is ". |
| DESCRIPTION | VARCHAR | 254 | N | A long description. |

*Fig. 5*

| GD_INDEX | | | | |
|---|---|---|---|---|
| Column | Type | Length | Nulls? | Description |
| TNAME | CHAR | 18 | N | The DB2 table name |
| CNAME | CHAR | 18 | N | The DB2 column name |
| TEST_FLG | CHAR | 1 | N | Entity test flag<br><br>P Promoted<br>N New<br>C Old Version<br>X Changed Version<br>D Deleted |
| INDEX_NM | CHAR | 18 | N | The name of the index |
| COL_SEQ | SMALLINT | | N | The sequence number for this attribute within the index |
| ASC_DESC | CHAR | 1 | N | Is this index ascending or descending?<br><br>A Ascending<br>D Descending |
| UNIQUERULE | CHAR | 1 | N | Is this key primary, unique or duplicate?<br><br>P Primary and Unique<br>U Unique<br>D Duplicate |
| CLUSTERING | CHAR | 1 | N | Should this be a clustered index?<br><br>Y Yes<br>N No |

| GD_FOREIGN_KEYS | | | | |
|---|---|---|---|---|
| Column | Type | Length | Nulls ? | Description |
| TNAME | CHAR | 18 | N | The DB2 table name |
| CNAME | CHAR | 18 | N | The DB2 column name |
| TEST_FLG | CHAR | 1 | N | Entity test flag<br><br>P Promoted<br>N New<br>C Old Version<br>X Changed Version<br>D Deleted |
| REL_NM | CHAR | 8 | N | The name of the relationship |
| COL_SEQ | SMALLINT | | N | The sequence number for this attribute within the key |
| DELETE_RULE | CHAR | 1 | N | Identifies which delete rule to use (Referential Integrity)<br><br>C Cascade<br>R Restrict<br>N Set Null |
| PARENT_TNAME | CHAR | 18 | N | Identifies which table is parent to the foreign key |

*Fig. 7*

| GD_ROUTE | | | | |
|---|---|---|---|---|
| Column | Type | Length | Nulls ? | Description |
| NODE_ID | CHAR | 8 | N | Node identification |
| DB_TYPE | CHAR | 10 | N | The type of database, file, etc... (e.g. DB2, MVS VSAM, IMS, Model 204, FOCUS, MVS UEI, VMS ORACLE, RMS, Rdb, System 2000, and VMS UEI). |
| DB_NM | CHAR | 44 | N | The name of the database, file, etc. (e.g. DB2 subsystem name, SQL/DS database name) |
| LOCATION_ID | CHAR | 16 | N | Location ID unique to each individual database. |
| EXT_IND | CHAR | 1 | D | Extractor Indication<br><br>A Distributed Relational Data Architecture (DRDA) "Cross Access Extractor |
| CONTACT | CHAR | 25 | N | The system contact for this platform (typically a person's name) |
| DATA_SRC | CHAR | 8 | N | The data source for this platform (ie. Dwight's PI, etc.) |
| MAX_ROWS | INTEGER | | N | The maximum number of rows allowed to be transfered at one time from this platform |
| TIME_OUT | INTEGER | | N | The maximum amount of time in minutes, allowed per transaction request from this platform |
| SELECT_LENGTH | SMALLINT | | N | Length of SELECT statement that Cross Access supports for a given platform in kilobytes. |

*Fig. 8*

| GD_XREF | | | | |
|---|---|---|---|---|
| Column | Type | Length | Nulls? | Description |
| ENTITY | CHAR | 18 | N | The entity name |
| ATTR | CHAR | 18 | N | The attribute name |
| TEST_FLG | CHAR | 1 | N | Note: A user in test mode will see rows with an Entity Test Flag of N, X or P. A user in production mode will see rows with an Entity Test Flag of C, D or P.<br><br>N New - A row representing a new object to be inserted in the GD tables.<br>X Changed Version - A row containing information to be used to update a row that exists in the GD tables.<br>C Old Version - A row containing the current information for a row that already exists in the GD tables, that will be updated by an X row. (The C row in the GD tables will not actually be changed; it represents the old information.)<br>D Deleted - A row containing information about a production row in the GD tables that should be deleted.<br>P Promoted - A row containing information about a row in the GD tables that was promoted to a production row. This row will remain the same in the GD tables. |
| CREATOR_ID | CHAR | 10 | N | The ID that created the remote table. (DBACC = X, PDF = R) |
| REMOTE_TNAME | CHAR | 32 | N | The name of the physical table or file where this entity resides. (DBACC = X, PDF = R) |

| GD_XREF | | | | |
|---|---|---|---|---|
| Column | Type | Length | Nulls ? | Description |
| REMOTE_CNAME | CHAR | 32 | N | The name of the physical column where the attribute resides. (DBACC = X, PDF = R) |
| UNITS | CHAR | 18 | N | The units of measure used for the attribute on the remote platform. |
| DATA_TYPE | CHAR | 18 | N | The data type of the attribute on the remote platform. (DBACC = B, PDF = R) |
| LENGTH | SMALLINT | | N | The length of the attribute on the remote platform. (DBACC = B, PDF = R) |
| SCALE | SMALLINT | | N | The scale of the attribute on the remote platform. (DBACC = B, PDF = R) |
| COL_TYPE | CHAR | 1 | N | Remote attribute column type.<br><br>B Short image bit data<br>L Long image dataset name<br><br>(DBACC = B, PDF = R) |
| CONV_MAPPING_ID | SMALLINT | | N | Conversion mapping ID used to identify all participating fields in a conversion process. Applies to complex conversions only. |
| RTN_NM | CHAR | 8 | N | DCAF conversion routine name |
| COMPLEX_ATTR | CHAR | 1 | D | Indicates that the attribute participates in a complex conversion between LDM and the source data.<br><br>O One-to-Many<br>M Many-to-Many<br>P Many-to-One |
| NODE_ID | CHAR | 8 | N | The Node ID where the entity and attribute reside. (DBACC = B, PDF = R) |

| GD_XREF | | | | |
|---|---|---|---|---|
| Column | Type | Length | Nulls? | Description |
| DB_TYPE | CHAR | 10 | N | The type of database in which the data are stored.<br><br>DB2 IBM DataBase 2<br>FOCUS Focus<br>IMS IMS<br>MODEL 204 Model 204<br>SQL/DS SQL Data System<br>S2K System 2000<br>VSAM VSAM<br><br>(DBACC = B, PDF = R) |
| DB_NM | CHAR | 44 | N | The name of the database, file, etc. For example:<br><br>Local DB2 subsystem<br>Remote DB2 location as in SYSIBM.SYSLOCATIONS for DRDA platforms<br>Focus database name<br>IMS DBD name<br>Model 204 file name<br>SQL/DS database name<br>System 2000 database name<br>VSAM cluster or DD name<br><br>(DBACC = X, PDF = R) |
| JOIN_IND | CHAR | 1 | N | Indicates if the attribute is joinable across source platforms. If so, the attribute is used to assemble data that is found on multiple databases.<br><br>Y Yes<br>N No |

| GD_XREF | | | | |
|---|---|---|---|---|
| Column | Type | Length | Nulls ? | Description |
| ATTR_PARM_NAME | CHAR | 18 | N | LDM attribute conversion parameter identifying the value being passed to DCAF. Used to place parameters into calling sequence. Blanks can be used if there is only one parameter. |
| CNAME_PARM_NAME | CHAR | 18 | N | Physical column conversion parameter identifying the value being passed to DCAF. Used to place parameters into calling sequence. Blanks can be used if there is only one parameter. |
| LEAF_SEG_NM | CHAR | 8 | N | Lowest level IMS segment to be retrieved. (DBACC = B) |
| SEG_NM | CHAR | 8 | N | IMS segment name identifying where data resides. (DBACC = B) |
| NULL_IND | CHAR | 1 | N | Field NULL indicator.<br><br>N NULL values not allowed.<br>S 1-8 byte arbitrary string used for NULL value. See NULL_STRING for the NULL string value.<br>T NULL values represented by a system type. See NULL_STRING for the NULL string type.<br><br>(DBACC = B) |
| NULL_STRING | CHAR | 8 | N | Field NULL string or NULL type.<br><br>1-8 byte arbitrary value such as "NOVAL", "?", "--------".<br>ALL<br>HI<br>LO<br>SPACE<br>ZEROS<br><br>(DBACC = B) |

| GD_XREF | | | | |
|---|---|---|---|---|
| Column | Type | Length | Nulls? | Description |
| NULL_STRING_LEN | SMALLINT | | N | Length of NULL string. (DBACC = B) |
| CONV_RTN_NM | CHAR | 8 | N | User conversion routine name. (DBACC = R) |
| CONV_ERR_ACTN | CHAR | 1 | N | Conversion routine error action. (DBACC = B) |
| FLD_OFFSET | INTEGER | | N | IMS or VSAM only. Displacement of field in segment. (DBACC = B) |
| ADJUST_ID | CHAR | 18 | N | IMS adjustment identifier. (DBACC = B) |
| BASE_ADJUST | INTEGER | | N | IMS base adjustment. Default is 0. (DBACC = B) |
| KEY_IND | CHAR | 1 | N | Model 204 key indicator.<br><br>P Primary key<br>S System generated primary key<br><br>(DBACC = B) |
| KEY_DEFN | CHAR | 1 | N | Model 204 key definition.<br><br>H Hash<br>K Key<br>O Ordered<br>R Range<br>S Sort<br><br>(DBACC = B) |
| JOIN_TNAME | CHAR | 18 | N | Model 204 join table containing field to join to non-repeating field. (DBACC = B) |
| FILE_TYPE | CHAR | 1 | N | VSAM file type indicator. (DBACC = B) |
| REC_PASS | CHAR | 8 | N | Model 204 record level password. (DBACC = R, PDF = R) |
| REPEAT_TNAME | CHAR | 18 | N | Model 204 repeating column table name (DBACC = B) |
| REMOTE_REC_NM | VARCHAR | 255 | N | Model 204 record name. (DBACC = B, PDF = R) |
| REMOTE_FLD_NM | VARCHAR | 255 | N | Model 204 field name. (DBACC = B) |

*Fig. 9E*

| GD_LOG_DETAIL | | | | |
|---|---|---|---|---|
| Column | Type | Length | Nulls? | Description |
| DOM_ENT_NM | CHAR | 18 | N | The name of the domain or entity to which the change was made |
| USER_ID | CHAR | 7 | N | The User ID of the person making the change |
| UPDATE_DTM | TIMESTAMP | | N | The update timestamp |
| TAB_FLG | CHAR | 1 | N | Indicator of which table this row is logging<br><br>L GD_LDM_PHYS<br>I GD_INDEX<br>F GD_FOREIGN_KEYS<br>E GD_ENT_TRANS<br>D GD_DOMAIN |
| OLD_ROW | VARCHAR | 419 | N | The old row that has been changed. Blank if this is an insert. |
| NEW_ROW | VARCHAR | 419 | N | The new row from the update. Blank if this is a delete. |

*Fig. 11*

METHOD AND SYSTEM FOR MANIPULATION OF DISTRIBUTED HETEROGENEOUS DATA IN A DATA PROCESSING SYSTEM

BACKGROUND OF THE INVENTION

1. Technical Field

The present invention relates in general to improved data processing systems and in particular to improved methods and systems for manipulating data within a distributed data processing system. Still more particularly the present invention relates to an improved method and system for manipulating distributed heterogeneous data within a distributed data processing system.

2. Description of the Related Art

The utilization of data processing systems to manipulate data is well known in the prior art. Early data processing systems were capable of manipulating small amounts of data which had been stored within the data processing system in a consistent rigid format. As the complexity of modern data processing systems has increased, so has the amount and complexity of data which may be manipulated by those systems.

While the increased speed and size of modern data processing systems permits the storage and manipulation of large amounts of data an additional factor must also be considered. It is not uncommon for large data processing systems to be created utilizing large numbers of subsystems which may be geographically distributed over large distances. As a direct result of such distributions of data processing systems it is increasingly common for large amounts of heterogeneous data to be available to a user within such a distributed data processing system. By "heterogeneous" data what is meant is data which is not consistent as to data type, data format, data attributes or data source parameters with other data stored within the data processing system.

As will be appreciated by those skilled in the art the increased complexity and heterogeneity of data within a modern data processing system has caused a concomitant increase in the complexity of the problems associated with retrieving and manipulating desired data. One solution to this problem is the utilization of so-called "tightly-coupled" systems in which all data within the system is connected to a single bus utilizing mass storage devices which are coupled to that bus. In this manner, such devices operate as a single unit.

Alternatively, "loosely-coupled" systems exist which permit data to be exchanged among units within the system by requiring all users to be aware of system topology and resources. An example of this type of system is described in U.S. Pat. No. 4,851,988. While such systems permit data to be widely accessed throughout the system, they require preknowledge of system resources and do not provide a consistent interface into various data types which may be stored within the system.

Thus, it should be apparent that a need exists for a method and system which permits the storage and manipulation of distributed heterogeneous data within a data processing system.

SUMMARY OF THE INVENTION

It is therefore one object of the present invention to provide an improved data processing system.

It is another object of the present invention to provide an improved method and system for manipulating data within a distributed data processing system.

It is yet another object of the present invention to provide an improved method and system for manipulating distributed heterogeneous data within a distributed data processing system.

The foregoing objects are achieved as is now described. Manipulation of distributed heterogeneous data in a data processing system having multiple diverse data sources is permitted by providing a global data directory which maps the location of data, specific data entity attributes and data source parameters. An attribute table is provided within the global data directory which sets forth desired attributes in a logical data model for each data entity within the data processing system. A domain table related to the attribute table is utilized to specify domain information for each data entity attribute. Route and cross-reference tables are provided and utilized to specify data source or database parameters and a cross-reference between logical names within the logical data model and the diverse data sources. Desired heterogeneous data is then accessed utilizing the route and cross-reference tables and converted utilizing any known technique into an output having the desired attributes set forth within the attribute table. In this manner, a consistent interface between multiple distributed heterogeneous data sources and a system user is provided.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 3 is a tabular illustration of an attribute table which may be utilized in accordance with the global data directory of FIG. 2;

FIG. 4 is a tabular illustration of a domain table which may be utilized in conjunction with the global data directory of FIG. 2;

FIG. 5 is a tabular illustration of a narrative description table which may be utilized in conjunction with the global data directory of FIG. 2;

FIG. 6 is a tabular illustration of an index table which may be utilized in conjunction with the global data directory of FIG. 2;

FIG. 7 is a tabular illustration of a foreign key table which may be utilized in conjunction with the global data directory of FIG. 2;

FIG. 8 is a tabular illustration of a route table which may be utilized in conjunction with the global data directory of FIG. 2;

FIGS. 9a–9e is a tabular illustration of a cross-reference table which may be utilized in conjunction with the global data directory of FIG. 2;

FIG. 10 is a tabular illustration of a reason table which may be utilized in conjunction with the global data directory of FIG. 2;

FIG. 11 is a tabular illustration of a detail table which may be utilized in conjunction with the global data directory of FIG. 2;

DETAILED DESCRIPTION OF PREFERRED EMBODIMENT

Figure 1:
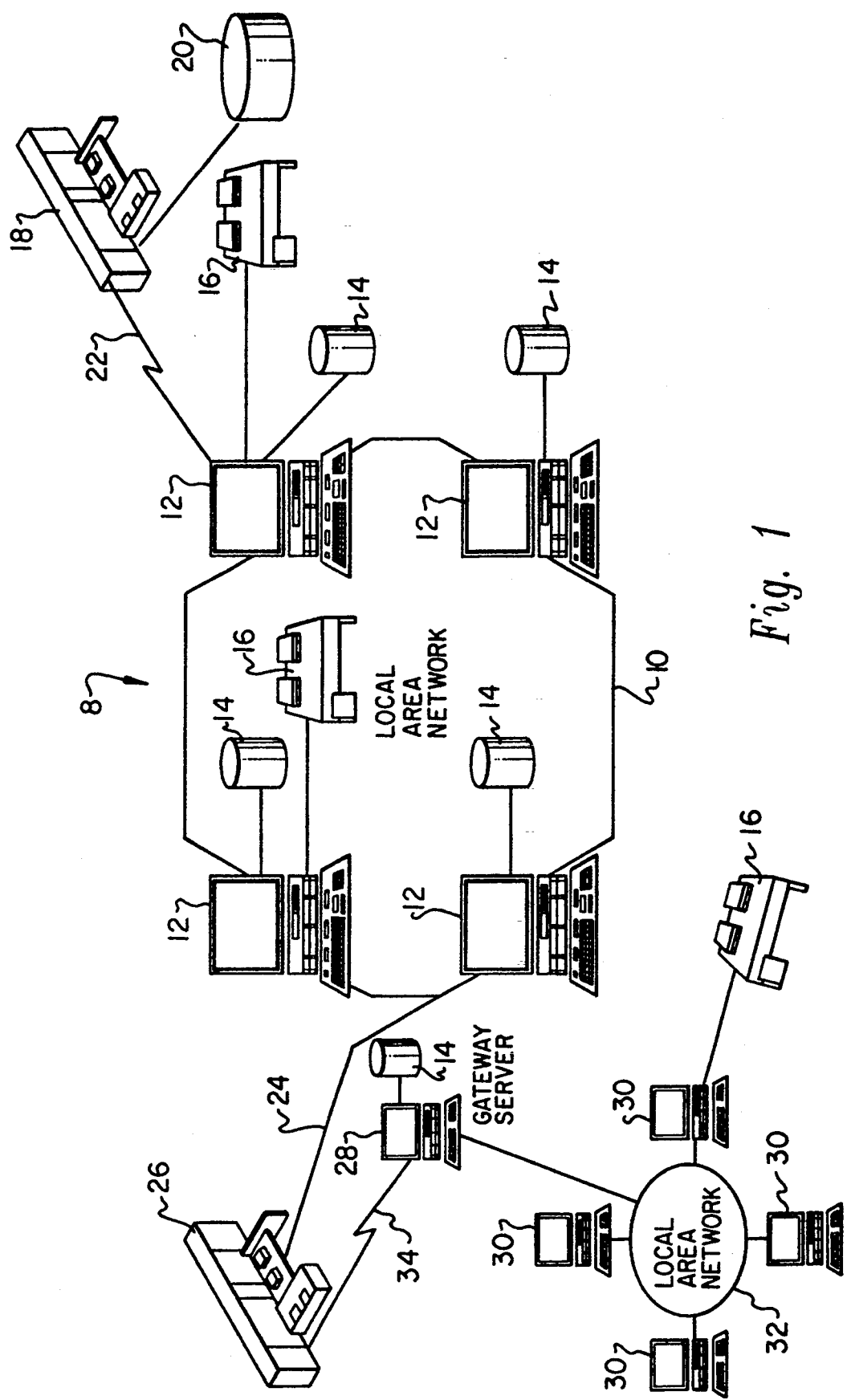
FIG. 1 illustrates a graphic depiction of a distributed data processing system which may be utilized to implement the method and system of the present invention.

With reference now to the figures and in particular with reference to FIG. 1, there is depicted a pictorial representation of a distributed data processing system 8 which may be utilized to implement the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method and system of the present invention, to store a data source or database having multiple heterogeneous data entities, which may be periodically accessed and processed by a user within distributed data processing system 8 in accordance with the method and system of the present invention. In a manner well known in the prior art, each such heterogeneous data entity may be stored within a storage device 14 which is associated with a resource manager or library service, which is responsible for maintaining and updating all data entities associated therewith.

Still referring to FIG. 1, it may be seen that distributed data processing system 8 may also include multiple main frame computers, such as main frame computer 18, which may be preferably coupled to Local Area Network (LAN) 10 by means of communication link 22. Main frame computer 18 may also be coupled to a storage device 20 which may serve as remote storage for Local Area Network (LAN) 10. Local Area Network (LAN) 10 may also be coupled to Local Area Network (LAN) 32 via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above, with respect to Local Area Network (LAN) 32 and Local Area Network (LAN) 10, a plurality of heterogeneous data entities may be stored within a database within storage device 20 and controlled by main frame computer 18, as resource manager or library service for the data entities thus stored. Of course, those skilled in the art will appreciate that main frame computer 18 may be located a great geographical distance from Local Area Network (LAN) 10 and similarly, Local Area Network (LAN) 10 may be located a substantial distance from Local Area Network (LAN) 32. That is, Local Area Network (LAN) 32 may be located in California, while Local Area Network (LAN) 10 may be located within Texas, while main frame computer 18 is located within New York.

As will be appreciated upon reference to the foregoing, it is often desirable for users within one portion of distributed data processing system 8 to access a data object or document stored within another portion of distributed data processing system 8. In order to maintain a semblance of order for entities stored within distributed data processing system 8 it is often desirable to implement an access control program. Such programs are generally accomplished utilizing a system which lists those users authorized to access each individual data entity along with a level of authority that each user may enjoy with regard to a particular data entity. In this manner, the authority to order the deletion, copying or movement of a selected data entity within distributed data processing system 8 may be restricted to a single user or a limited number of users.

While existing access control systems permit exacting control to be established regarding the manipulation of data entities within a large distributed data processing system such as distributed data processing system 8, of greater concern is the ability of users within the system to access and manipulate various diverse types of data which may be stored within multiple diverse data sources or databases within distributed data processing system 8. That is, it is not uncommon for many different data types to be stored within such a distributed data processing system in multiple data sources which each require different parameters and techniques for accessing data stored therein.

As one example, in the petrochemical industry, it is not uncommon for large distributed data processing systems to contain millions of data files covering such diverse subjects as exploration data, real estate data, well production data, and contractual information. This data is often widely dispersed and difficult to locate utilizing even the most sophisticated distributed data processing system due to the wide variety of data management software, operating system software, network protocols and various types of hardware devices upon which the data physically resides.

It should therefore be apparent that a need exists for a method and system which provides a consistent interface which may be utilized to access and manipulate heterogeneous data entities which are stored throughout a distributed data processing system within a multitude of diverse data sources.

Figure 2:
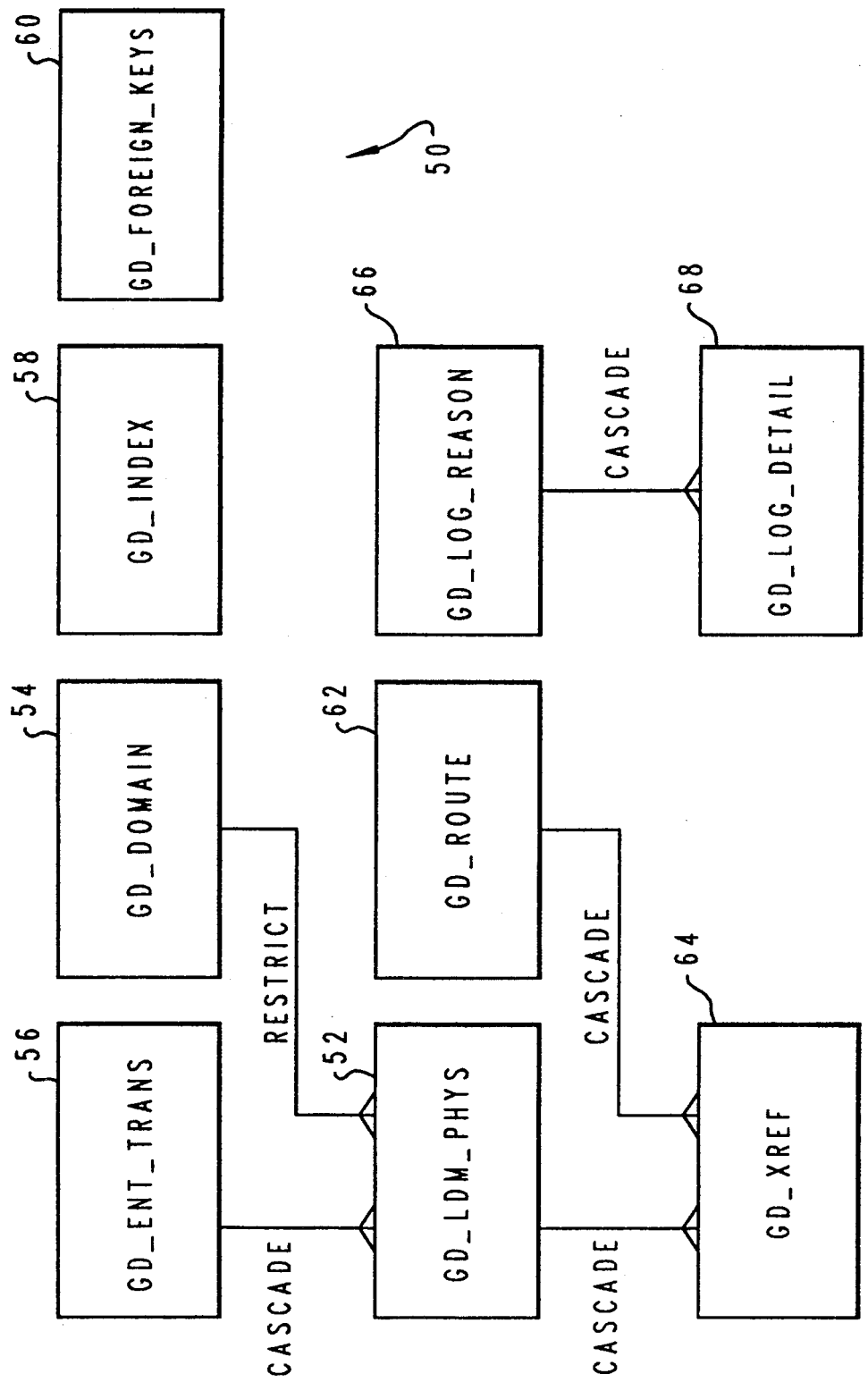
FIG. 2 is a graphic illustration of a global data directory which may be utilized to manipulate heterogeneous data within the data processing system of FIG. 1 in accordance with the method and system of the present invention.

Referring now to FIG. 2, there is depicted a graphic illustration of a global data directory 50 which may be utilized to manipulate heterogeneous data within a distributed data processing system in accordance with the method and system of the present invention. As will be explained in greater detail herein, the global data directory depicted within FIG. 2 includes nine separate data tables, five of which are relational data model tables, which contain information regarding the logical data model. Included within these tables are multiple forms of information regarding data within the distributed data processing system including: data entity names; attribute names; physical table names; physical column names; null information; column sequence numbers; domain information; foreign key information; a description of each data entity; and, a description of each attribute. Additionally, two tables within the global data directory are provided which hold mapping (cross-reference information) including entity names; conversion mapping information; node IDs; database type and database name. Finally, two tables are provided which contain logging information setting forth changes to the data model which have been made.

Still referring to FIG. 2, it may be seen that one table within the global data directory 50 is attribute table 52 (GD_LDM_PHYS). This table sets forth the desired attributes for all data entities which are permitted within the logical data model. Next, the domain table 54 (GD_DOMAIN) is illustrated. Domain table 54 sets forth and defines domain information for each attribute within attribute table 52. By "domain" information what is meant is a physical description of each attribute listed within attribute table 52, such as the size of each field and the permitted entries for that field. As illustrated, the relationship between domain table 54 and attribute table 52 is a RESTRICT delete rule.

Next, a narrative description table 56 (GD_ENT_TRANS) is provided and is utilized to provide a narrative description of each data entity within the logical data model which may be utilized by the user to provide additional information regarding a particular data entity. The relationship between narrative description table 56 and attribute table 52 is a CASCADE delete rule. Referring now to index table 58 (GD_INDEX), this table is utilized to build the data tables within the logical data model and specifies those attributes within each data entity which make that entity unique. Similarly, foreign key table 60 (GD_FOREIGN_KEYS) provides a list of foreign keys which are needed to create tables of entities. These foreign keys set forth the manner in which two tables within a database are related.

Next, route table 62 and cross-reference table 64 (GD_ROUTE and GD_XREF) are illustrated. These tables exist in a CASCADE delete relationship and set forth the specifics for each physical database within the global data directory and a cross-reference between logical names within the logical data model and the physical data sources which exist within distributed data processing system 8. By utilizing route table 62 and cross-reference table 64, heterogeneous data which is stored within distributed data processing system 8 may be retrieved and the attributes of that retrieved data compared to the attributes listed within attribute table 52, in order to conform that data to a consistent format within distributed data processing system 8.

With reference now to FIG. 3 there is depicted a tabular illustration of attribute table 52 (GD_LDM_PHYS) which may be utilized within global data directory 50 of FIG. 2. As those skilled in the art will appreciate, tables typically include columns and rows and the tabular illustration within each of the following figures sets forth each column within an associated table, the type of data contained within that column, the length of the field represented within that column, whether or not null values are permitted and a description of each column. Of course, multiple rows will be present within each table for multiple listings under each of these columns.

Additionally, the examples set forth within the following figures are specific to the accessing of relational data in a database such as the IBM Database 2 (DB2) database. Those skilled in the art will appreciate that a DB2 database utilizes the so-called "Structured Query Language" (SQL) to access data within such a database. As will be apparent to those who have worked in relational databases, SQL statements are utilized to retrieve data. Such statements may also insert, update, or delete data. Additionally, it is possible to access data within a DB2 database without knowing SQL techniques by utilizing other programs which may access data by utilizing SQL statements contained within those programs.

Referring again to attribute table 52 depicted within FIG. 3, it may be seen that this table includes multiple columns including ENTITY and ATTRIBUTE. These columns list the entity name and attribute name for a particular attribute within a data entity in a DB2 format. Further entries such as table name (TNAME) and column name (CNAME), as well as entries which indicate the sequence number and domain of the attribute are also listed within this column. Finally, a narrative description of greater length is included which permits the inclusion of a narrative description of each attribute which is described within this table.

Next, referring to FIG. 4, there is depicted a tabular illustration of domain table 54 within global data directory 50 of FIG. 2. As described above, domain table 54 sets forth with specificity the characteristics or "domain" for each attribute set forth within attribute table 52. That is, the name of the domain, its data type, the length of the attribute, the scale of the attribute, the units of measurement for an attribute associated with this domain and various other details which may be utilized to characterize each attribute listed within attribute table 52.

With reference now to FIG. 5, there is depicted a tabular illustration of narrative description table 56 which may be utilized within global data directory 50 of FIG. 2. Narrative description table 56(GD_ENT_TRANS) is primarily utilized to set forth a detailed narrative description of each entity within the data model so that a user may quickly and efficiently identify a particular data entity within the data model. Of course, those skilled in the art will appreciate that short names and mnemonics may often prove to be confusing when specifying a data entity and narrative description table 56 solves this problem by providing a table which includes a detailed narrative description of each entity within the data model.

Referring to FIG. 6, there is illustrated in tabular form index table 58 (GD_INDEX) which sets forth that index information which is necessary to create tables of the entities within global data directory 50 of FIG. 2. This table is utilized to specify those attributes which make each data entity unique within the data model, such as the sequence number for an attribute and an indication of whether or not the index is ascending or descending. Further, index table 58 also includes an indication of whether or not the key within this table is unique or a duplicate and whether or not this should be a clustered index.

With reference now to FIG. 7, there is illustrated a tabular depiction of foreign key table 60 (GD_FOREIGN_KEYS) which lists those attributes or keys which tie two or more entities together in a relational manner. Thus, as illustrated therein, foreign key table 60 lists the name of the relationship between two entities, the sequence number for the attribute within the foreign key and identifies what delete rule to utilize for the relationship specified. Further, foreign key table 60 identifies which table is the parent table for the foreign keys listed therein.

Referring now to FIG. 8, there is illustrated a tabular depiction of route table 62 (GD_ROUTE) which, as described above, lists all of the physical databases or sources which contain data which is described within global data directory 50 of FIG. 2 and information relevant to each database or data source. For example, the type of database is listed within route table 62 along with the name of the database, file or subsystem. A unique location identifier for each individual database and an extractor indication is also set forth within route table 62. A system contact for each platform identified within route table 62 and the data source for that platform are also listed within route table 62. Finally, operational parameters for each database, such as the maximum number of rows permitted to be transferred at one time and the maximum amount of time in minutes allowed per transaction are also set forth within route table 62. Thus, as those skilled in the art will appreciate, data within any listed database within distributed data processing system 8 (see FIG. 1) may therefore be accessed utilizing the data contained within route table 62.

Referring now to FIGS. 9a-9e, there is depicted a tabular illustration of cross-reference table 64 (GD_X-REF) which is utilized to provide a cross-reference between logical names within the logical data model and the physical data sources within the data processing system.

As illustrated within FIGS. 9a-9e, cross-reference table 64 includes a column listing the entity name and attribute name. Additionally, a test flag column is provided permitting the user to determine the status of rows within the table as existing in either a test mode or a production mode. Those skilled in the database arts will appreciate that prior to the release of a database data may be entered in a so-called "test" mode for testing purposes. Also listed within cross-reference table 64 is an identification of the creator of the remote table referenced therein and the name of the physical table or file where that data entity resides.

Referring now to FIG. 9b, the name of the physical column where a particular attribute resides, the units of measurement utilized for that attribute on the remote platform and the data type of that attribute on the remote platform are also specified. FIGS. 9c, 9d and 9e list those physical parameters, control data and conversion routines which must be utilized to access data within one of the plurality of diverse data sources within distributed data processing system 8. Thus, cross-reference table 64 may then be utilized in conjunction with route table 62 to provide the means for accessing data at any point within distributed data processing system 8, if that data is mapped within the global data directory of FIG. 2.

Referring now to FIG. 10, there is depicted a tabular illustration of reason table 66 (GD_LOG_REASON) which, as described above, is utilized to store the identification of a user making a change to the logical data model, a time stamp for the moment when that change occurred and a reason that the logical data model was changed. Those having skill in this art will appreciate that this table provides an excellent tool for auditing changes to the logical data model, In conjunction with reason table 66, detail table 68 (GD_LOG_DETAIL) is also provided and is illustrated in tabular form within FIG. 11. As depicted within FIG. 11, the details of each change to a table containing the logical data model are stored within this table for future review and audit purposes.

Figure 12:
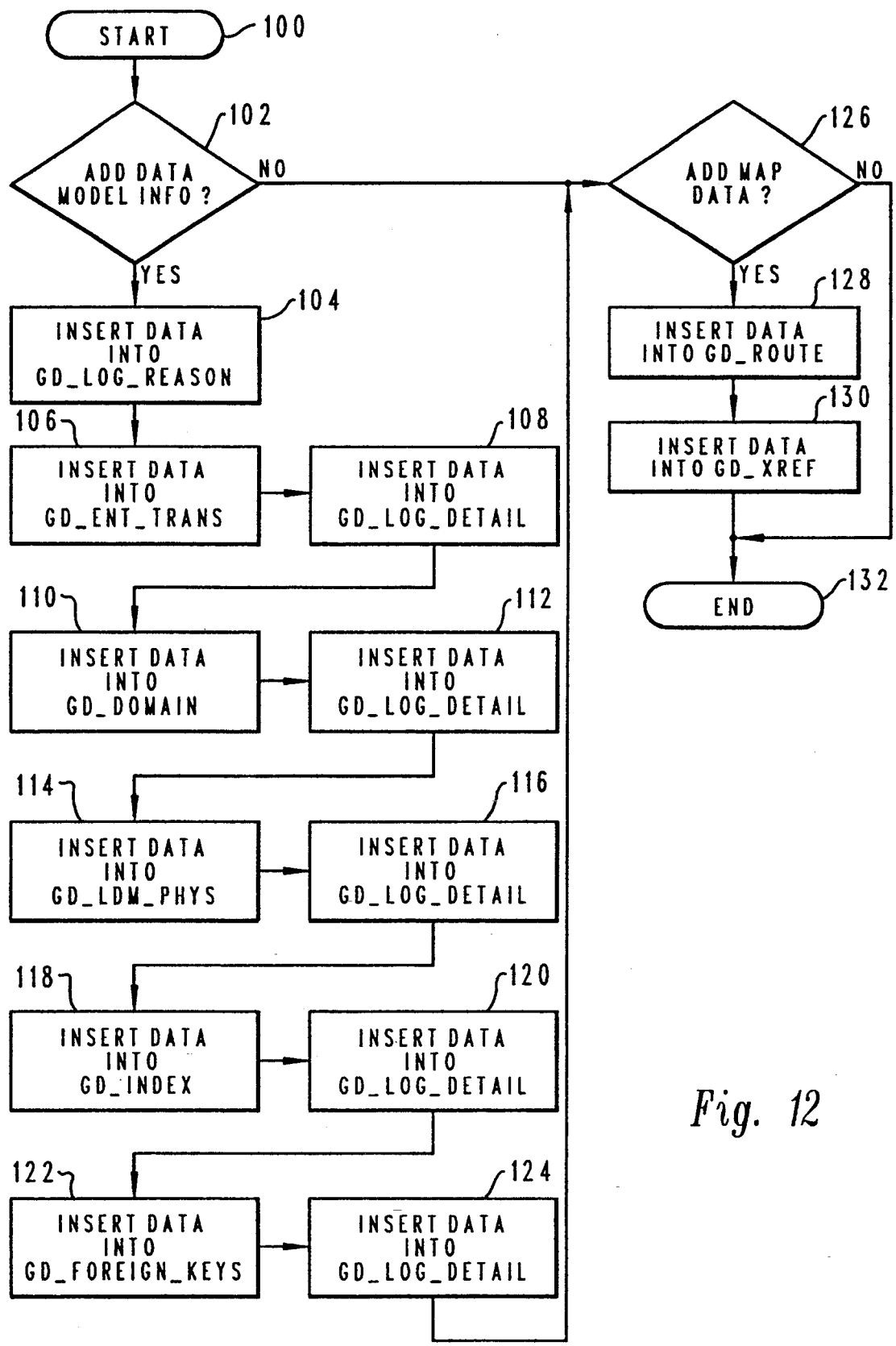
FIG. 12 is a high level logic flowchart illustrating the alteration of the global data directory of FIG. 2 following a data edition to the data processing system.

Referring now to FIG. 12, there is depicted a high level logic flowchart which illustrates the manner in which the data entities listed within the global data directory of FIG. 2 may be altered. For purposes of illustration, this flowchart details the steps following the addition of data model information into the global data directory; however, those skilled in the art will appreciate that alteration or deletion of data will follow similar steps. As depicted, the process begins at block 100 and thereafter passes to block 102. Block 102 illustrates a determination of whether or not the user desires to add data model information to global data directory 50 of FIG. 2. That is, the user wishes to specify additional data types not previously listed within the logical data model. If so, the process passes to block 104 which illustrates the insertion of this data into reason table 66 and thereafter the process passes to block 106. Block 106 illustrates the insertion of this data into narrative description table 56 and, in concert with this insertion, block 108 illustrates the insertion of that data into detail table 68, for the purposes described above. Thereafter, as illustrated in block 110, the data is then inserted into domain table 54 and this information is similarly inserted into detail table 68, as depicted at block 112.

In a similar manner, as illustrated in blocks 114-124, the data model information added to global data directory 50 is inserted into attribute table 52, index table 58, and foreign key table 60 and, following each insertion that data is also noted within detail table 68.

Thereafter, following the updating of each table containing logical data model information, or in the event data model information was not added to global data directory 50, the process passes to block 126. Block 126 illustrates a determination of whether or not map data is to be added to global data directory 50. By adding map data to global data directory 50 what is meant is adding additional data sources or the mapping of new logic data model data to existing sources so that this data may be accessed utilizing global data directory 50.

In the event additional map data is to be added to global data directory 50, the process passes from block 126 to block 128. Block 128 depicts the insertion of that data into route table 62 and thereafter, the process passes to block 130. Block 130 illustrates the insertion of the appropriate data into cross-reference table 64 and thereafter, the inserted data may be efficiently and readily accessed within distributed data processing system 8, utilizing route table 62 and cross-reference table 64 in the manner described above. Thereafter, or in the event no map data was to be added to global data directory 50, as determined at block 126, the process passes to block 132 and terminates.

As described above, those skilled in the art will appreciate that the Applicants herein have provided a global data directory which may be utilized to specify heterogeneous data entities stored at various locations within a distributed data processing system in a manner which will permit those data entities to be rapidly and efficiently manipulated utilizing only that information contained within the global data directory.

Figure 13:
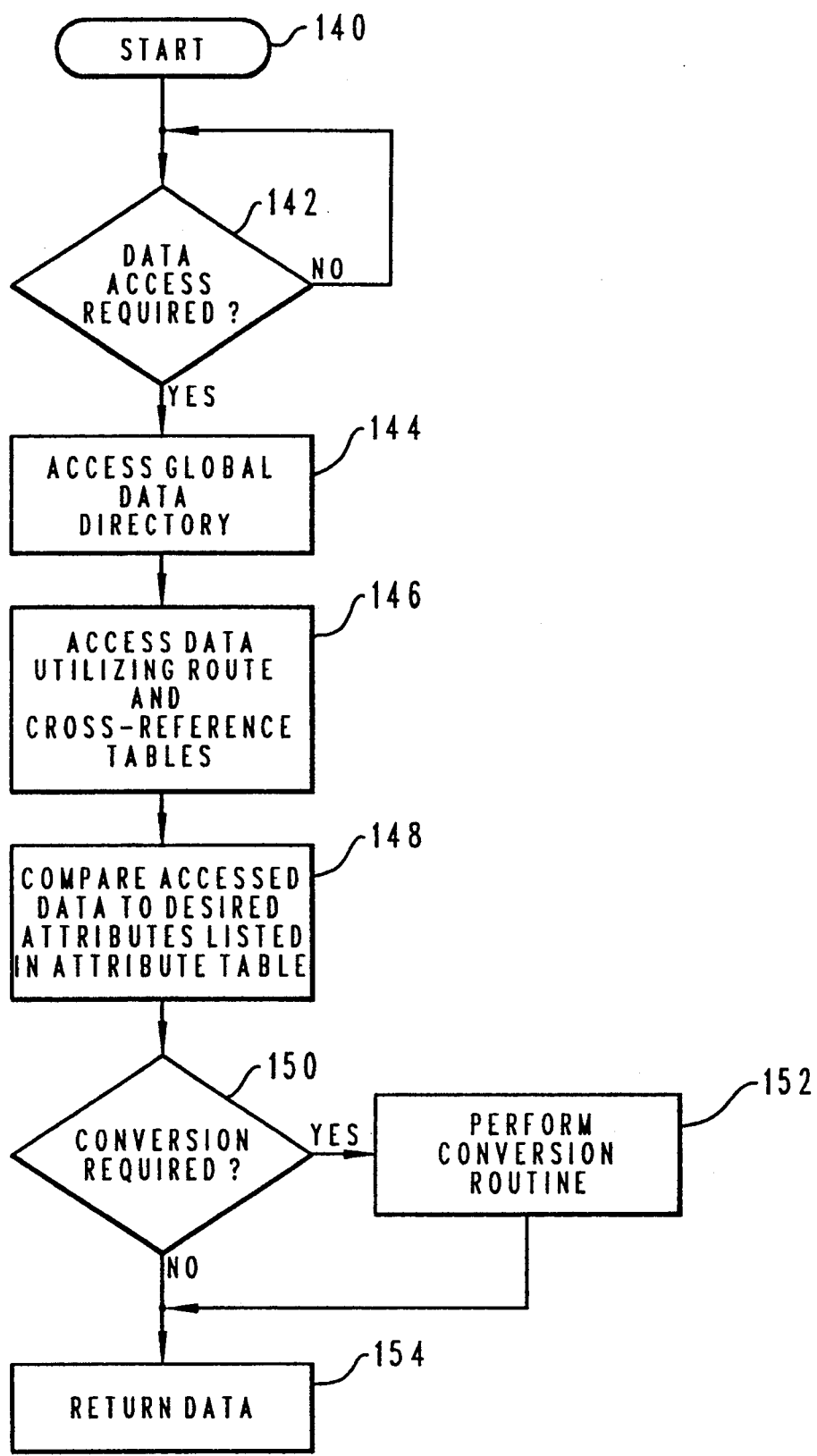
FIG. 13 is a high level flowchart illustrating the retrieval and conversion of heterogeneous data in accordance with the method and system of the present invention.

Finally, with reference to FIG. 13, there is depicted a high level logic flowchart which illustrates the accessing of data within distributed data processing system 8 (see FIG. 1) in accordance with the method and system of the present invention. As illustrated, the process begins at block 140 and thereafter passes to block 142.

Block 142 illustrates a determination of whether or not a data access is required and if not, the process merely iterates until such time as data access is required. However, in the event a data access is required, the process passes to block 144. Block 144 illustrates the accessing of global data directory 50 of FIG. 2. Thereafter, as depicted at block 146, the desired data is accessed within distributed data processing system 8 (see FIG. 1) utilizing the route and cross-reference tables contained within global data directory 50.

After accessing the desired data that data is compared to the desired attributes listed within attribute table 52 (see FIG. 2), as illustrated at block 148. The process then passes to block 150 which depicts a determination of whether or not a conversion is required to process the accessed data into a consistent format set forth by the attributes for that data entity which are listed within attribute table 52. If no conversion is required, the process passes to block 154 which illustrates the returning of that data. However, in the event a conversion is required, the process passes to block 152. Block 152 illustrates the performance of a conversion routine necessary to convert the accessed data into the desired consistent format, and thereafter, the data is returned, as illustrated at block 154.

Upon reference to the foregoing those skilled in the art will appreciate that the Applicants herein have provided a novel method and system whereby heterogeneous data stored within multiple diverse data sources throughout a distributed data processing system may be accurately and efficiently accessed and presented to a user in a consistent format, without the necessity of requiring that user to have preknowledge of the topology of the system or the parameters associated with each individual data source.

While the invention has been particularly shown and described with reference to a preferred embodiment, it will be understood by those skilled in the art that various changes in form and detail may be made therein without departing from the spirit and scope of the invention.

We claim:

1. A method for enhanced manipulation of distributed heterogeneous data in a data processing system having a plurality of diverse data sources therein, said method comprising the steps of:
    establishing a global data directory which includes:
        an attribute table listing desired attributes for a plurality of data entities within said data processing system;
        a domain table listing domain information for each of said desired attributes for said plurality of data entities within said data processing system;
        a route table listing each of said plurality of diverse data sources within said data processing system; and
        a cross-reference table listing a cross-reference between logical names within a logical data model and said plurality of diverse data sources;
    accessing said distributed heterogeneous data within said data processing system utilizing said cross-reference table and said route table; and
    converting said accessed distributed heterogeneous data into a consistent format having desired attributes utilizing said attribute table and said domain table, wherein a consistent interface into said distributed heterogeneous data is provided.

2. The method for enhanced manipulation of distributed heterogeneous data in a data processing system according to claim 1, further including the step of establishing an index table within said global data directory listing those attributes which make each data entity unique within said data processing system wherein tables within said logical data model may be created.

3. The method for enhanced manipulation of distributed heterogeneous data in a data processing system according to claim 1, further including the step of establishing a reason table within said global data directory listing a reason for each update of a table containing logical data model wherein updates to said logical data model may be analyzed.

4. The method for enhanced manipulation of distributed heterogeneous data in a data processing system according to claim 1, further including the step of establishing a detail table within said global data directory listing all updates to tables containing said logical data model wherein changes to said logical data model at any point in time may be determined.

5. The method for enhanced manipulation of distributed heterogeneous data in a data processing system according to claim 1, further including the step of establishing a narrative description table within said global data directory including a narrative description of each of said plurality of data entities within said data processing system wherein a user may efficiently determine a selected one of said plurality of data entities.

6. A data processing system for efficiently manipulating distributed heterogenous data within said data processing system, said data processing system comprising:
    a plurality of diverse data sources within said data processing system, said plurality of diverse data sources including multiple heterogeneous data entities stored therein;
    a global data directory within said data processing system, said global data directory including:
        an attribute table listing desired attributes for each of said multiple heterogeneous data entities;
        a domain table listing domain information for each of said desired attributes for each of said multiple heterogeneous data entities;
        a route table listing each of said plurality of diverse data sources within said data processing system; and
        a cross-reference table listing a cross-reference between logical names within a logical data model and said plurality of diverse data sources;
    access means for accessing selected ones of said multiple heterogeneous data entities within said data processing system utilizing said cross-reference table and said route table within said logical data model; and
    conversion means for converting said accessed selected ones of said multiple heterogeneous data entities into a consistent format having desired attributes utilizing said attribute table and said domain table wherein a consistent interface into said distributed heterogeneous data is provided.

7. A data processing system for efficiently manipulating distributed heterogeneous data within said data processing system according to claim 6, further including an index table within said global data directory listing those attributes which make each of said multiple heterogeneous data entities unique.

8. A data processing system for efficiently manipulating distributed heterogeneous data within said data processing system according to claim 6, further including a reason table within said global data directory listing a reason for each update of a table containing said logical data mode.

9. A data processing system for efficiently manipulating distributed heterogeneous data within said data processing system according to claim 6, further including a detail table within said global data directory listing all updates to tables containing said logical data model.

10. A data processing system for efficiently manipulating distributed heterogeneous data within said data processing system according to claim 6, further including a narrative table within said global data directory listing a narrative description of each of said multiple heterogeneous data entities within said data processing system.

* * * * *